United States Patent [19]

Åhs

[11] Patent Number: 4,572,755

[45] Date of Patent: Feb. 25, 1986

[54] METHOD OF MANUFACTURING AN ELASTIC AND FLEXIBLE BACKING

[75] Inventor: Vilgot Åhs, Koppom, Sweden

[73] Assignee: Töcksfors Verkstads AB, Töcksfors, Sweden

[21] Appl. No.: 427,186

[22] Filed: Sep. 29, 1982

[30] Foreign Application Priority Data

Oct. 7, 1981 [SE] Sweden ................................ 8105916

[51] Int. Cl.[4] ......................... B32B 31/00; B32B 31/20

[52] U.S. Cl. .................................... 156/166; 156/230; 156/247; 156/290; 156/292; 156/321; 156/322; 219/528

[58] Field of Search ............... 156/290, 166, 292, 297, 156/321, 247, 344, 176, 230, 237, 239, 240, 241; 219/528

[56] References Cited

U.S. PATENT DOCUMENTS 2,022,519 11/1935 Payne .................................. 156/292
3,674,914 7/1972 Burr .................................... 156/166
4,179,324 12/1979 Kirkpatrick ......................... 156/230

*Primary Examiner*—Jay H. Woo
*Assistant Examiner*—Timothy W. Heitbrink
*Attorney, Agent, or Firm*—Burns, Doane, Swecker & Mathis

[57] ABSTRACT

The present invention relates to a method of laying out and fixing a thin electric conductor on an elastic and flexible backing for heating seats and back of chairs, cushions, mattresses and the like. The method includes the steps of advancing the conductor out of a magazine and forming the conductor to a substantially permanent zigzag pattern constituting a strand. The strand is guided at a selected feed speed from a feeding arrangement to a structural body to be attached to a surface of the structural body. The feeding arrangement is moved along the structural body in a pattern desired for the completed product at a speed such that the relative speed between the strand and the structural body is substantially zero. The strand is fixedly attached to the structural body by an adhesive.

4 Claims, 2 Drawing Figures

METHOD OF MANUFACTURING AN ELASTIC AND FLEXIBLE BACKING

BACKGROUND AND SUMMARY OF THE PRESENT INVENTION

This invention relates to a method of manufacturing an elastic and flexible backing, which is intended to carry an electric conductor for heating seats or backs of chairs, cushions, mattresses and the like.

Electrically heated car seats, supports, cushions, rugs etc. are known. The electric conductor heating the object can consist of one or more electrically conductive wires and is applied in windings extending over the structural body of the carrier in question. Over this carrier and the conductor with its windings the covering and protecting outer layer of textile or other material, for example a compound of textile and foamed plastic, is laid. The conductor can also be applied directly on the backside of the outer layer.

All these known applications have in common that the conductor is applied in extended state on the carrying layer, i.e. the conductor between the bendings or windings is substantially non-resilient or "dead". This in its turn implies that the conductor is sensitive to fatigue and overload, which already after a short time gives rise to fractures. In a particular application, for example, electrically heated car seats, the conductor in such seats to-day has an average life corresponding to a covered distance of about 30 000 km. For solving this problem, the conductor has been enclosed in a plane strip, in which the conductor is permitted to form an S-like pattern. The object of this is that the strip takes up the tensile loads occurring and relieves the conductor, and at the same time a product is obtained which is easy to handle, simple to apply on the carrier or structural body. Because of the strip, the conductor cannot be laid out in rounded windings, but must be laid at sharp angles as it is turned through 180° and overlapping. Its application, therefore, is time-consuming, and the double thickness of the strip in the folds forms undesirable local thickenings in the product.

The disadvantages of the electrically heated objects of the aforesaid type are eliminated by the present invention. Referring again to the car seat as an example, it can be mentioned that, according to the results of tests carried out, the car seat by the invention is given a life which exceeds substantially the life of an average car.

BRIEF DESCRIPTION OF THE DRAWINGS

The invention is described in greater detail in the following by way of an embodiment, with reference to the accompanying drawings, in which.

DETAILED DESCRIPTION OF THE PREFERRED EMBODIMENTS

Figure 1:
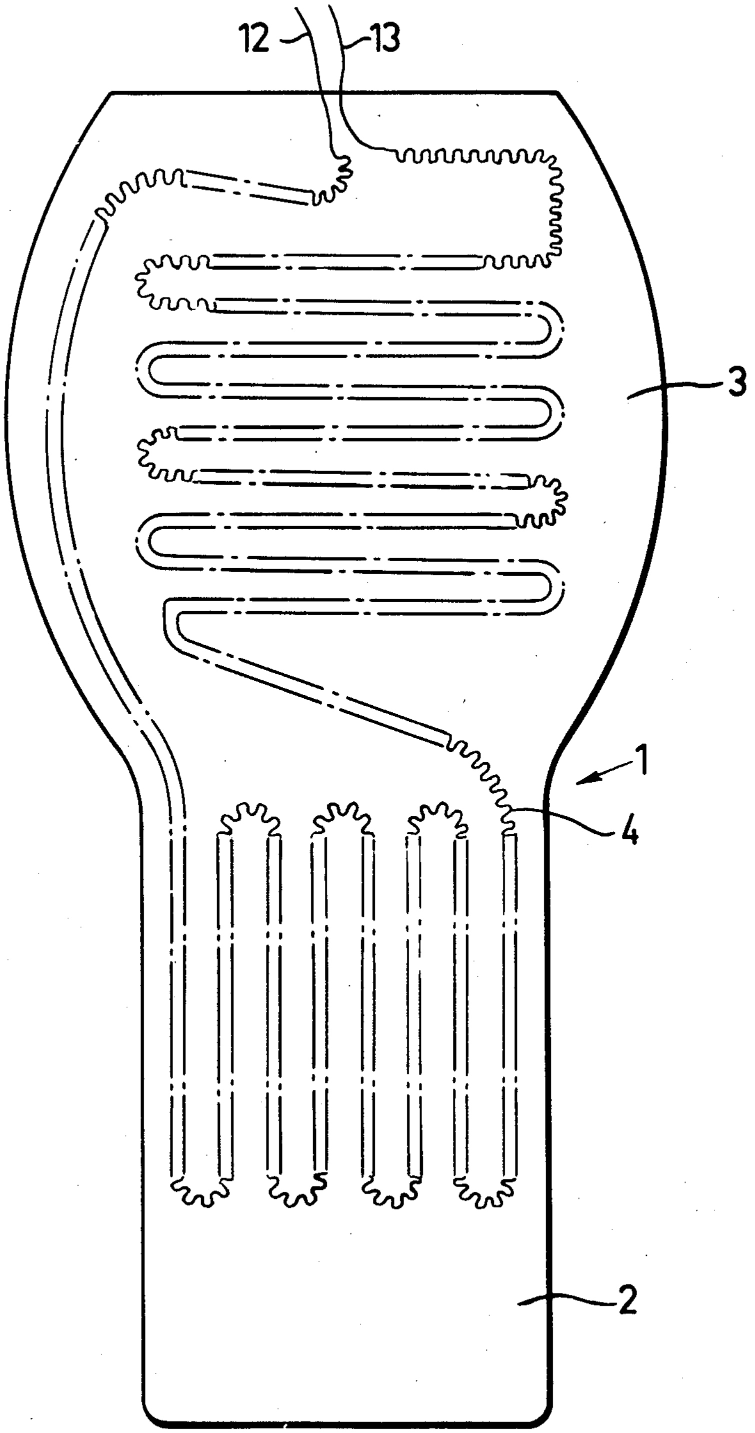
FIG. 1 is a schematic view of a structural body according to the present invention of a heating cushion for a seat, for example for cars.
Figure 2:
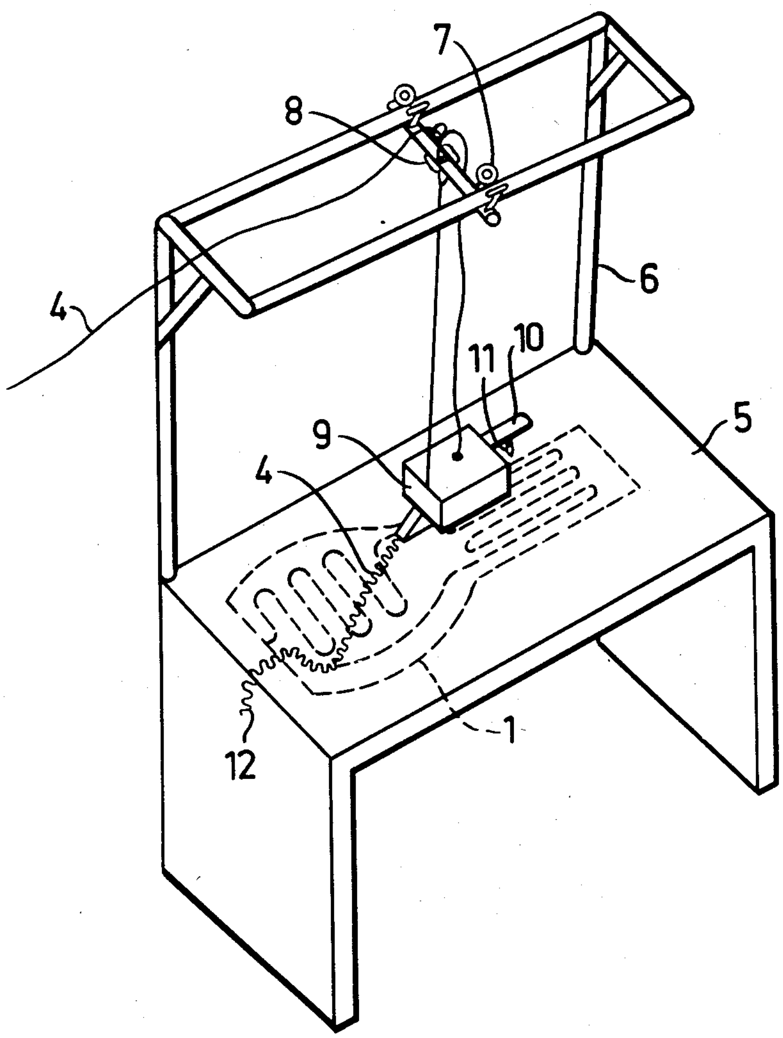
FIG. 2 is a perspective view of an apparatus for carrying out the method of the present invention.

In the illustrated embodiment, the structural body consists of a foamed plastic sheet 1 of about 1 cm thickness, which is integrally formed with first portion 2 to abut the back of the seat and with a second wider portion 3 to cover the seat. A thin electric conductor 4 comprising a number of electrically conductive wires is formed to a zigzag pattern and laid out in windings extending in a predetermined way on the structural body 1. The conductor 4 is laid out according to the method of the invention which is described in greater detail with reference to FIG. 2.

The structural body 1 is positioned on a top 5 of a table. The desired predetermined extension of the conductor 4 can be marked, for example, directly on the structural body, or the table top 5 may constitute a luminous table, which is lighted from below and on which the extension is drawn. A prerequisite of this latter solution is that the extension drawn is visible through the material of the structural body.

A strand 6 carries a runner 7, which is movable above and along the table, and which in its turn carries a carriage 8 movable parallel to the table. Suitably spaced from the upper surface of the table a feed means 9 is suspended on a wire attached to the carriage 8, whereby the feed means 9 can be moved freely over the table top, and therewith over the structural body 1. At the embodiment shown, the feed means is guided manually by a handle 10. The conductor 4 to be applied on the structural body 1 is directed from above from a magazine (not shown) down to the feed means 9. The feed means comprises as primary components a pair of meshing gear wheels driven by an electric motor. The conductor is passed between the gear wheels and advanced by the same, and at the same time the conductor is formed to zigzag pattern. The speed of the gear wheels, and thereby the speed of advancement of the conductor, is adjustable, for example by a trigger 11 or by the handle being rotatable. The remaining components of the feed means are known per se and assembled in a way conventional to the expert and, therefore, they are not described here in greater detail.

Simultaneously with the feed means 9 being advanced over the structural body 1 along the marked extension, the conductor 4 is advanced, depending on the skill of the operator, at a speed corresponding substantially to the feed speed whereby the speed of the conductor 4 relative to the structural body 1 is equal to zero. The zigzag pattern brought about by the gear wheels must not be deformed appreciably, and especially the conductor must not be straightened, at the same time as it is laid in the windings intended over the structural body 1. The free ends 12 and 13 of the conductor formed at the beginning and completion of the application procedure of the conductor are intended to be soldered on an electric connecting portion, which is secured on the structural body 1 by sewing or glueing. Said connecting portion is not described here in detail.

By coating the structural body 1 with an adhesive, the conductor 4 automatically is fixed thereon as it is being advanced and applied on the structural body along the intended extension. On the adhesive surface of the structural body 1 with the conductor, a thin sheet, for example of fabric type, is attached, and the structural body with conductor thus completed is placed in a protective casing looking aesthetically attractive.

Instead of the example described above, the structural body may be provided with a surface coated with a hot hardening binding agent or thermosetting glue, and the structural body heated while the conductor is being applied.

As structural body is considered within the scope of the invention also the casing proper or the backing or lining of the seat, cushion, rug, mattress or the like, in which case the conductor in the way described above is applied directly on the backing or support.

The structural body further may consist of a base in the form of a carrying support, which at the laying out of the conductor is heated in spots in suitably selected places. The conductor, which in this case is coated with thermosetting glue, will adhere to the base in the selected places. The conductor can now be applied on the object in question, for example a seat, a textile material for such a seat among others by the base and conductor adhered thereon to the object and passing current through the conductor, which thereby is heated and adheres to the object. It is thereafter possible to remove the base from the conductor because the latter is attached to the base substantially only in spots. As the heat supplied in spots can be adjusted, it is possible to ensure that the fixing of the conductor on the base at the laying out operation is not too strong, which facilitates the removal of the base from the conductor. At the same time as the conductor is charged to be heated and attached to the object, automatically the function of the conductor is tested. Such test is necessary prior to the delivery, and otherwise is to be carried out as a separate measure at the manufacturing process.

As an alternative, the base can be heated in veins when this is deemed more suitable in view of the intended extension of the conductor.

Instead of heating the structural body in spots or veins, the conductor can be fixed thereon while being laid out by means of pins arranged in the table, and the conductor coated with thermosetting glue is attached by the supply of current. It also can be imagined to use a magnetic table and a magnetic conductor for fixing on the structural body.

The structural body also may consist of a foil, on which the conductor coated with an adhesive or an adhesive thermosetting glue is fixed, and on which foil with conductor, a second foil is attached to the conductor. For attaching the conductor on the object in question, one foil is removed, the conductor with the remaining foil is pressed onto the object, and this foil thereafter is removed from the conductor now adhering to the object. The foils shall be of such nature that the conductor does not adhere too strongly on the surface of the foils.

It is understood that within the scope of the invention the conductor can be applied on the structural body entirely or partly automatized and not, as described here, manually.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressely intended that all such variations and changes which fall within the spirit and scope of the present invention as defined in the claims be embraced thereby.

What I claim is:

1. A method for laying out and fixing a thin electric conductor on an elastic and flexible backing, said backing defining a structural body provided with an uninterrupted planar surface for heating seats and backs of chairs, cushions, mattresses and the like, comprising the steps of advancing the conductor out of a magazine, forming the conductor to a substantially permanent zigzag pattern constituting a strand, guiding the strand at a selected feed speed by feed means to the structural body so as to attach said strand to said planar surface of the structural body, moving the feed means along the structural body in a pattern desired for the completed product at a speed such that the relative speed between the strand and the structural body is substantially zero so that said strand is retained in the pattern desired on the planar surface by movement of said feed means, and fixedly attaching the strand formed of the conductor to the structural body by an adhesive.

2. The method as defined in claim 1, wherein the adhesive is a thermosetting glue, and further comprising the steps of coating the conductor with the thermosetting glue, and heating the structural body in spots or veins, whereby the conductor while being laid out is fixed on the structural body in the heated spots or veins.

3. The method as defined in claim 1, wherein the structural body is provided with the adhesive on the surface on which the conductor is laid out.

4. The method as defined in claim 1, wherein the step of fixedly attaching the conductor on the structural body comprises coating the conductor with the adhesive, and further comprising the steps of attaching a foil sheet to the conductor which is attached to the structural body, applying the conductor to an object after removing one of the structural body and the foil sheet, fixing the conductor which is still attached to a remaining one of the structural body and the foil sheet to the object, and removing said remaining one of the foil sheet and the structural body.

* * * * *